Dec. 8, 1959   W. L. WINCHELL   2,915,937
VISOR
Filed March 20, 1958
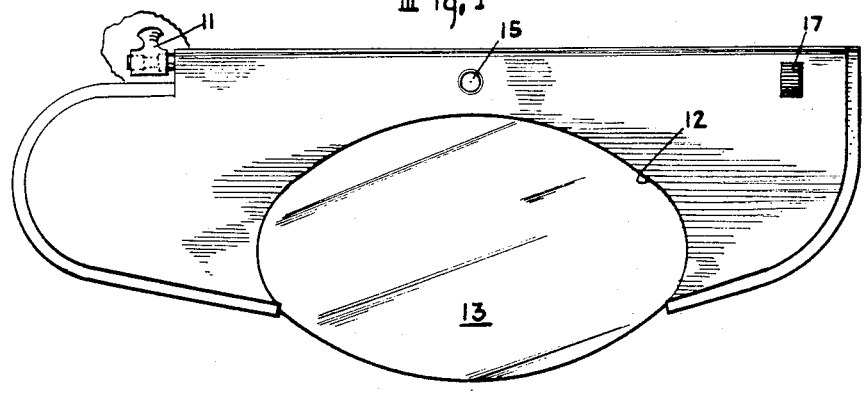
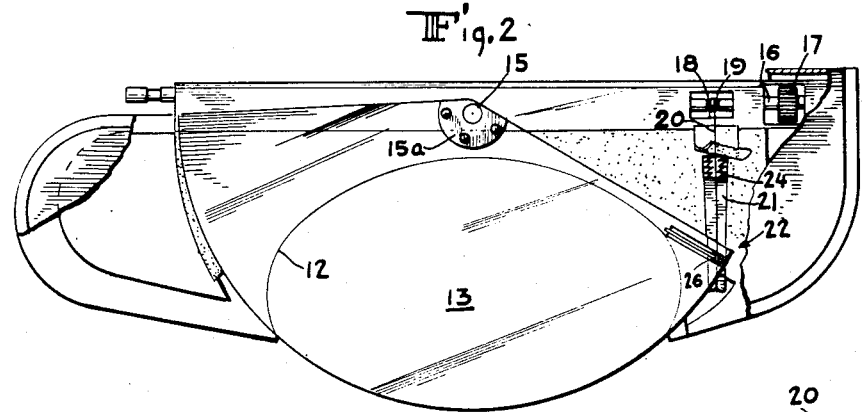
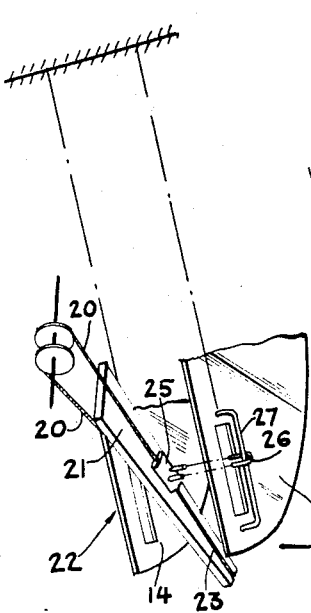
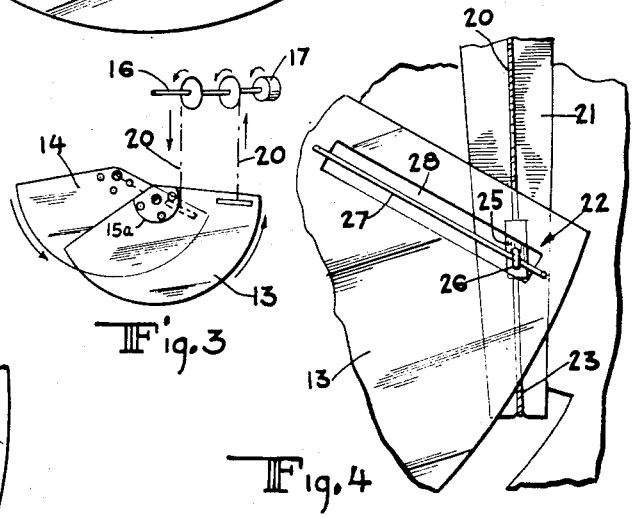
INVENTOR
Wesley L. Winchell
BY
ATTORNEY

United States Patent Office 2,915,937
Patented Dec. 8, 1959

2,915,937

VISOR

Wesley L. Winchell, Kingston, N.Y.

Application March 20, 1958, Serial No. 722,684

6 Claims. (Cl. 88—1)

This invention relates to visors for automobiles or the like, and particularly to a visor which can be adjusted as to the intensity of the light to be admitted therethrough.

It is an object of this invention to provide an automobile visor which can be mounted in place of the normal visor but which can control the amount of outside light reaching the eyes of the driver.

It is another object of this invention to provide an economical visor which is capable of easy adjustment to obtain varying degrees of opacity so that the operator of the automobile can make the necessary adjustments depending on the amount of exterior light and his own preferences.

It is another object of this invention to provide a novel positioning construction for simultaneously rotating two pieces of light polarizing material in opposite directions by the rotation in one direction of a control knob.

The visor of the invention requires no special mountings and thus is simple to install. It is easily adjusted to various light polarizing positions and eliminates the need of costly tinted glass which has inherent disadvantages since it cannot be adjusted to obtain varying degrees of opacity.

The visor of the invention has a cutout portion in the main body, a pair of pieces of light polarizing material superimposed on each other and mounted so as to cover a part of the cutout portion. The pieces of light polarizing material are mounted on the visor for independent pivotal movement about a common axis and cover a part of the cutout portion. Means are provided for simultaneously rotating the pieces in opposite directions so that the pieces of light polarizing material can be set to admit the desired intensity of light. This rotating means includes a shaft rotatable about an axis transverse to the axis of rotation of the pieces of light polarizing material. Strand means, attached to each piece at a point spaced from the axis of rotation thereof, has its ends coiled in opposite directions about the shaft on the same side of the axis of rotation of the pieces. Thus when the shaft is rotated the pieces will rotate about their common axis in opposite directions.

These and other objects, features and advantages of the invention will become apparent from the following detailed description and drawings which are merely exemplary.

In the drawings:

Fig. 1 is a front elevation of the visor of the invention;

Fig. 2 is a front elevation of the visor of the invention with parts broken away to show its operation;

Fig. 3 is an exploded schematic view of the pieces of polarized material showing their operation;

Fig. 4 is an enlarged view of the connection between a strand and one piece of light polarizing material; and Fig. 5 is a schematic perspective view of a portion of the visor of the invention.

As shown in Fig. 1, the visor of the invention can be mounted on a conventional visor mounting bracket 11. The visor is made of two layers of covered fiberboard. A cutout portion 12 is provided in the range of vision of the operator, so that he will be looking through the light polarizing material mounted in the visor when the visor is in its lowered position, in a manner to be described hereinafter. Two pieces of light polarizing material 13 and 14 are mounted in superimposed relation for simultaneous relative rotation about pivot pin 15. It is to be understood that although both of the pieces are rotatable about the pivot pin in the preferred form shown in the drawings, the important feature is the relative position of the two pieces. Thus, the desired polarizing effect could be obtained even if one piece were fixed while the other was rotatable relative thereto.

As shown in the drawings, the preferred form of the invention has both pieces mounted for rotation about pivot pin 15, each piece being rotatable through an angle of 45°. The pieces are rotated in opposite directions, in a manner to be described later, so that the maximum relative displacement of the pieces is 90°. This allows the pieces of polarized material to be rotated from a position where the grains of the pieces are parallel, to a position where the grains are crossed or perpendicular to each other, thereby changing the viewing portion of the visor from transparent to opaque.

In order to avoid any tendency of the pieces to warp in an undesired manner and also to minimize the contact area between the two pieces, a support 15a is provided which gives the filter piece a cupped shape or a warp to a predetermined shape. The support 15a may be secured to the piece in any desired manner, as, for example, by rivets as shown in Figs. 2 and 3. When the pieces are mounted, this inward bending of the edges of each piece results in their center or viewing portions being spaced from each other eliminating the possibility of one piece scratching the viewing portion of the other piece.

The mechanism for rotating the pieces in opposite directions is shown in Figs. 2–5. A horizontal shaft 16 is mounted in the visor with its axis transverse to the axis of rotation of the pieces of light polarizing material 13 and 14. This shaft is rotatable in response to movement of knurled knob 17 in the appropriate direction. Knob 17 extends through a suitable aperture in the front face of the visor, so that it may be readily rotated by the operator of the vehicle. Each of a pair of strings 20 of equal length is secured at one end to a suitable connection between it and its respective light polarizing piece, shown generally at 22. Circumferential curling recesses 18 and 19 in shaft 16 may be provided adjacent the points of attachment of the strings 20 to the shaft. In order to keep strings 20 properly tensioned at all times, tensioning strand means or string 23 is secured at one end to connection 22 on piece 13 and the other end to connection 22 on piece 14. String 23 passes under the lower edge of a bar 21 which is vertically movable in a groove within the visor body. Bar 21 is urged downwardly by springs 24 so that tension is maintained in strings 20 and 23 at all times. It is clear from a consideration of the drawings that the two strings 20 and the string 23 form a continuous strand means secured at both ends to shaft 16 and secured to the light polarizing pieces 13 and 14 at spaced points intermediate the ends. Spring pressed bar 21 acts on the strand means at a point intermediate the connection between the strand means and piece 13 and the connection between the strand means and piece 14.

Each connection 22 includes a short connecting piece 25 to which the free end of one string 20 is secured and to which one end of string 23 is secured. Extending outwardly from the central portion of piece 25 is an eyelet 26 through which a thin bar 27 passes. Bar 27 is attached at both ends to the light polarizing piece. In order to permit the eyelet to move freely in a longitudinal direction relative to bar 27, the portion of the light polarizing piece underlying the bar is cut out as at 28. Thus as the string 20 is coiled and uncoiled to rotate the piece of light polarizing material, the eyelet moves relative to bar 27 so that the string remains in a plane generally perpendicular to the shaft 16.

The operation of the rotating means is as follows: As seen in Fig. 2, the string attached to piece 14 is coiled about shaft 16 in its respective recess while the string attached to piece 13 is uncoiled. In this situation, as also shown in Fig. 2, piece 13 is in its extreme clockwise position while piece 14 is in its extreme counterclockwise position; rotation of knob 17 in a clockwise direction coils the string attached to piece 13 and uncoils the string attached to piece 14, thereby causing the rotation of pieces 13 and 14 in opposite directions; this relative rotation may be continued until the string connected to piece 13 is completely coiled and the string connected to piece 14, at which time piece 13 is in its extreme counterclockwise position while piece 14 is in its extreme clockwise position; rotation of knob 17 in a counterclockwise position will reverse the above procedure.

From the above description of the operation of the rotating means, it is clear that the relative positions of the pieces of light polarizing material 13 and 14 can be adjusted so that their combined effect will result in any desired degree of opacity in the area where they are in superimposed relation.

It is to be understood that details of construction may be varied without departing from the spirit of the invention except as defined in the appended claims.

What is claimed is:

1. An automobile visor having a cutout portion therein, comprising a pair of pieces of light polarizing material superimposed on each other and mounted on said visor for independent pivotal movement about a common axis, said pieces covering at least a part of said cutout portion, and means for simultaneously rotating said pieces in opposite directions so that the pieces can be set to admit the desired intensity of light, said rotating means including a shaft rotatable about an axis transverse to the axis of rotation of said pieces, and strand means attached to each piece at a point spaced from and on the same side of the axis of rotation thereof, the ends of said strand means being coiled in opposite directions about said shaft on the same side of said axis of rotation of said pieces, means acting on the portion of said strand means between the points of attachment thereof to said pair of pieces to maintain tension on said strand means at all times, so that when said shaft is rotated in one direction said pieces will simultaneously rotate about their common axis in opposite directions.

2. An automobile visor having a cutout portion therein, comprising a pair of pieces of light polarizing material superimposed on each other and mounted on said visor for independent pivotal movement about a common axis, each of said pieces covering said cutout portion, and means for simultaneously rotating said pieces in opposite directions so that the pieces can be set to admit the desired intensity of light, said rotating means including a shaft rotatable about an axis transverse to the axis of rotation of said pieces, and strand means attached to each piece at a point spaced from and on the same side of the axis of rotation thereof, the ends of said strand means being coiled in opposite directions about said shaft on the same side of said axis of rotation of said pieces, spring pressed means acting on the portion of said strand means between the points of attachment thereof to said pair of pieces to maintain tension on said strand means at all times, so that when said shaft is rotated in one direction said pieces will simultaneously rotate about their common axis in opposite directions.

3. An automobile visor having a cutout portion therein, comprising a pair of pieces of light polarizing material superimposed on each other and mounted on said visor for independent pivotal movement about a common axis, each of said pieces covering said cutout portion, and means for simultaneously rotating said pieces in opposite directions so that the pieces can be set to admit the desired intensity of light, said rotating means including a shaft rotatable about an axis transverse to the axis of rotation of said pieces, strand means attached to each piece at a point spaced from and on the same side of the axis of rotation thereof, the ends of said strand means being coiled in opposite directions about said shaft on the same side of said axis of rotation of said pieces, the points of attachment between said strand means and each of said pieces being spaced from each other, a spring pressed bar which engages said strand means at a point intermediate said points of attachment to tension said strand means at all times, and means for rotating said shaft so that said pieces will simultaneously rotate about their common axis in opposite directions.

4. An automobile visor having a cutout portion therein, comprising a pair of sectoral shaped pieces of light polarizing material superimposed on each other and mounted on said visor for independent pivotal movement about a common centrally located axis, each of said pieces covering said cutout portion, and means for simultaneously rotating said pieces in opposite directions so that the pieces can be set to admit the desired intensity of light, said rotating means including a shaft rotatable about an axis transverse to the axis of rotation of said pieces, strand means, means for slidably securing the corner of each piece on the same side of said common axis to said strand means, the ends of said strand means being coiled in opposite directions about said shaft on the same side of said axis of rotation of said pieces, said slidable securing means including an eyelet connected to said strand means and a thin rod along which said eyelet travels so that said strand means is perpendicular to said shaft regardless of the position of said pieces, spring pressed means acting on the portion of said strand means between the points of attachment thereof to said pair of pieces to maintain tension on said strand means at all times, and means for rotating said shaft so that said pieces will simultaneously rotate about their common axis in opposite directions.

5. An automobile visor having a cutout portion therein, comprising a pair of pieces of light polarizing material superimposed on each other and mounted on said visor for independent pivotal movement about a common axis, said pieces covering at least a part of said cutout portion, and means for simultaneously rotating said pieces in opposite directions so that the pieces can be set to admit the desired intensity of light, said rotating means including a shaft rotatable about an axis transverse to the axis of rotation of said pieces, strand means attached to each piece at a point spaced from and on the same side of the axis of rotation thereof, the ends of said strand means being coiled in opposite directions about said shaft on the same side of said axis of rotation of said pieces, means acting on the portion of said strand means between the points of attachment thereof to said pair of pieces to maintain tension on said strand means at all times, and an operating knob extending beyond the front of the body of said visor and rotatably secured to said shaft so that when said knob is rotated in one direction said shaft will rotate in the same direction to move said strand means, thereby simultaneously rotating said pieces about their common axis in opposite directions.

6. An automobile visor having a cutout portion therein, comprising a pair of pieces of light polarizing material superimposed on each other and mounted on said visor for independent pivotal movement about a common axis, each of said pieces covering said cutout portion, means for bending said pieces into cupped shape so that the central viewing portions thereof will be spaced from each other, and means for simultaneously rotating said pieces in opposite directions so that the pieces can be set to admit the desired intensity of light, said rotating means including a shaft rotatable about an axis transverse to the axis of rotation of said pieces strand means attached to each piece at a point spaced from and on the same side of the axis of rotation thereof, the ends of said strand means being coiled in opposite directions about said shaft on the same side of said axis of rotation of said pieces, and means acting on the portion of said strand means between the points of attachment thereof to said pair of pieces to maintain tension on said strand means at all times, so that when said shaft is rotated in one direction said pieces will simultaneously rotate about their common axis in opposite directions.

References Cited in the file of this patent

UNITED STATES PATENTS

| | | |
|---|---|---|
| 2,423,321 | Hurley | July 1, 1947 |
| 2,423,322 | Hurley | July 1, 1947 |
| 2,856,810 | Frost | Oct. 21, 1958 |